United States Patent [19]

Horn et al.

[11] Patent Number: 5,760,099
[45] Date of Patent: Jun. 2, 1998

[54] PRODUCTION OF RIGID OR SEMIRIGID POLYURETHANE FOAMS AND COMPOSITE ELEMENTS COMPRISING SUCH POLYURETHANE FOAMS

[75] Inventors: Peter Horn, Heidelberg; Gerhard Lehr, Schwegenheim; Sarbananda Chakrabarti, Mannheim; Dieter Hertel, Leimen; Ludwig Jung, Mammendorf, all of Germany

[73] Assignee: BASF Aktiengesellschaft, Ludwigshafen, Germany

[21] Appl. No.: 711,452

[22] Filed: Sep. 6, 1996

[30] Foreign Application Priority Data

Sep. 11, 1995 [DE] Germany ............... 195 33 610.0

[51] Int. Cl.[6] ......................................... C08J 9/06
[52] U.S. Cl. ..................... 521/159; 521/107; 521/114; 521/121
[58] Field of Search ........................... 521/159, 107, 521/114, 121

[56] References Cited

U.S. PATENT DOCUMENTS 5,183,830  2/1993  Mohring et al. .
5,334,448  8/1994  Horn et al. .
5,512,602  4/1996  Horn et al. .

FOREIGN PATENT DOCUMENTS 904 230    9/1962  United Kingdom .
1 079 256  8/1967  United Kingdom .
1 344 038  1/1974  United Kingdom .

*Primary Examiner*—John M. Cooney, Jr.
*Attorney, Agent, or Firm*—Fernando A. Borrego

[57] ABSTRACT

Rigid polyurethane foams, preferably semirigid polyurethane foams, are produced by reacting an organic and/or modified organic polyisocyanates with relatively high molecular weight polyhydroxyl compounds and, optionally, low molecular weight chain extenders and/or crosslinkers in the presence of water or mixtures of water and physically acting blowing agents, optionally, catalysts, at least one additive selected from the group consisting of sulfonate salts of an acid group-containing alkylene oxide polymer, a phosphonate salt of an acid group-containing alkylene oxide polymer, and mixtures thereof, additional other additives and optionally, auxiliaries. The polyurethane foams produced by this process can be used to produce composite comprising at least one covering layer and at least one layer comprising a rigid or semirigid polyurethane foam produced by the process of the present invention.

20 Claims, No Drawings

PRODUCTION OF RIGID OR SEMIRIGID POLYURETHANE FOAMS AND COMPOSITE ELEMENTS COMPRISING SUCH POLYURETHANE FOAMS

The invention relates to a process for producing rigid polyurethane (PU) foams or preferably semirigid PU foams by reacting a) organic and/or modified organic polyisocyanates with b) relatively high molecular weight polyhydroxyl compounds and, if desired, c) low molecular weight chain extenders and/or crosslinkers in the presence of d) blowing agents, e) if desired, catalysts, f) additives and g) if desired, auxiliaries, herein water or mixtures of water and physically acting blowing gents are used as blowing agent (d) and the additives (f) comprise at least one compound of the formulae (f1) to (f4)

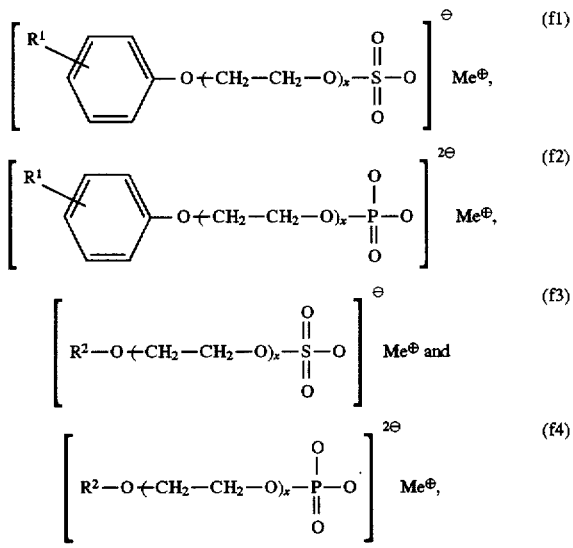

where
R$^1$ and R$^2$ are linear or branched alkyl radicals having from 1 to 32 carbon atoms
X is an integer from 1 to 35 and
Me is sodium, potassium, ammonium, calcium or magnesium, with the proviso that the number of cations and anions is equivalent, and composite elements comprising A) at least one covering layer and B) at least one layer of a rigid PU foam or preferably semirigid PU foam produced by the process of the invention.

The production of PU foams by reacting organic polyisocyanates with relatively high molecular weight polyhydroxyl compounds and, if desired, chain extenders and/or crosslinkers in the presence of catalysts and blowing agents and, if desired, additives and auxiliaries is known and is described in numerous patent and literature publications. Examples which may be mentioned are Kunststoff-Handbuch, Volume VII, Polyurethane, 1st edition, 1966, edited by Dr. R. Vieweg and Dr. A. Höchtlen, 2nd edition, 1983, edited by Dr. G. Oertel and 3rd edition, 1993, edited by Dr. G. W. Becker and Dr. D. Braun, Carl Hanser Verlag, Munich, Vienna.

Also known is the production of semirigid PU foams by the prepolymer process, usually on the basis of tolylene diisocyanate (TDI) prepolymers, and the one-shot process, advantageously using mixtures of diphenylmethane diisocyanates (MDI) and polyphenylpolymethylene polyisocyanates, known as raw MDI, as polyisocyanates. By targeted selection of relatively high molecular weight polyhydroxyl compounds and chain extenders and/or crosslinkers and by use of different amounts of polyisocyanate and water, semirigid PU foams having different mechanical properties can be produced by this process. Semirigid PU foams can also be produced without concomitant use of water by the frothing process with addition of dichlorodifluoromethane as blowing agent. Polyhydroxyl compounds used here are a combination of branched, relatively high molecular weight polyoxyalkylene polyols and amine-initiated chain extenders having hydroxyl numbers in the range from 450 to 500. The polyaddition reaction can be activated by organic tin compounds (Kunststoff-Handbuch, Volume VII, Polyurethane, 2nd edition, 1983, edited by Dr. G. Oertel, Carl Hanser Verlag, Munich, Vienna).

PU foams are advantageously produced with addition of tertiary amines as catalysts, since these accelerate both the reaction between the hydroxyl groups of the polyhydroxyl compounds and NCO groups of the polyisocyanates, the urethane formation, and also the reaction between water and NCO groups to form amino groups and carbon dioxide as blowing gas, the blowing reaction, where, particularly in the one-shot process, the rates of the reactions occurring in parallel have to be exactly matched to one another. Since in foam formation crosslinking reactions to form allophanate, urea, biuret and cyanurate structures can occur in addition to the polyaddition and blowing reaction, the catalysts used have to ensure that these various rections occur synchronously. The catalysts must neither lose their catalytic activity as a result of premature incorporation into the polyurethane framework, nor accelerate the hydrolytic decomposition of the PU foam produced.

A disadvantage is the unpleasant odor of many tertiary amines used in practice as catalyst, which odor can be carried over to the PU foams produced and have an adverse effect on their use for certain applications. According to DE-A-23 21 884 (GB-A-1 344 038), polyether polyols prepared using a tertiary amine as catalyst are used in combination with an acid and a silicone oil for producing PU foams.

Low-odor PU foams can also be obtained by the method described in EP-A-0 624 611 (CA-A-2 122 973). According to this process, the PU foams, preferably semirigid PU foams, are produced from the formative components customary per se, but with polyoxyalkylene polyols having a hydroxyl number of from 200 to 1300 and containing from 150 to 1200 ppm of alkali metal ions being used in combination with inorganic and/or organic acids as crosslinker. The PU foams described were used, inter alia, for backfoaming of films comprising a PVC/ABS polymer mixture. Composite elements comprising at least one covering layer of PVC or a polymer mixture containing polyvinyl chloride and a semirigid or rigid PU foam are also described in EP-A-0 490 145 (U.S. Pat. No. 5,334,448).

Although these processes enable low-odor or essentially odor-free rigid and semirigid PU foams having very good mechanical properties to be produced, and these foams are widely used in industry, particularly in vehicles, in some industrial processes certain production fluctuations were not able to be completely suppressed. These production fluctuations can, in the backfoaming of covering layers, lead to moldings having an increased number of voids. If the rigid PU foams or preferably semirigid PU foams are produced using polyisocyanates, which may be modified, and water for in situ formation of carbon dioxide as sole blowing agent, the water in relatively large amounts, eg. in amounts of over 1.6% by weight based on the polyhydroxyl compounds, is generally insoluble in the A component, ie. for the European skilled in the art of polyurethanes, the mixture of the formative components (b) to (g). This incompatibility of the water with the other formative components leads to an inhomogeneous, turbid A component. Since this inhomogeneity can usually not be completely eliminated by continual intensive stirring, this can lead to production fluctuations resulting in considerable reworking of the moldings and/or increased reject rates, which can cause a considerable increase in the production costs.

There have therefore been many attempts to improve, inter alia, the compatibility of water with the other formative components in the A component by means of appropriate selection of polyhydroxyl compounds, eg. polyoxypropylene-polyoxyethylene polyols containing an effective amount of hydrophilic ethylene oxide units or polyester polyols having increased hydrophilicity and/or by addition of emulsifiers having a wide variety of chemical structures, for example ethoxylated phenols, $C_9$–$C_{11}$-oxoalcohols, alkali metal stearates, alkali metal paraffinsulfonates, polydimethylsiloxanes, polyoxyalkylene-polydimethylsiloxane block copolymers.

According to, for example, DE-C-1 178 595, additives used are addition products of anhydrides of polybasic carboxylic acids and polyhydric alcohols, whose carboxyl groups are present in salt form or are alkoxylated. U.S. Pat. No. 4,751,251 describes a surface-active mixture for rigid PU foams comprising a siloxane-free organic surface-active compound, a siloxane-polyoxyalkane and a $C_1$–$C_3$-alcohol. EP-A-0 458 009 (U.S. Pat. No. 5,183,830) describes a process for producing highly elastic foams containing urethane groups and having a reduced compressive strength in the presence of a compound having at least one polyoxyalkylene radical and at least one anionic radical in the molecule. Flexible PU foams produced in this way are widely used in the upholstered furniture and automobile industries. However, the publication gives no information regarding the production of other PU foams.

It is an object of the present invention to eliminate or at least largely reduce the production fluctuations in the production of rigid PU foams, preferably semirigid PU foams, foamed using water. Without restricting the production reliability, the known and proven relatively high molecular weight polyhydroxyl compounds, particularly polyoxyalkylene polyols, from CFC foaming are to be available for PU foam production. In the backfoaming of films for forming composite elements such as dashboards for the automobile industry, void formation is to be reduced to a minimum level and the reject rate and the production costs are to be lowered thereby. The water compatibility and thus the water content of the A component is to be increased without its storage stability and physical properties being adversely affected or its processing being made more difficult.

We have found that this object is achieved by the use of water or mixtures of water and physically acting blowing agents as blowing agent in combination with at least one of the specifically selected additives (f1) to (f4) mentioned below.

The invention accordingly provides a process for producing rigid polyurethane foams, preferably semirigid polyurethane foams, by reacting a) organic and/or modified organic polyisocyanates with b) relatively high molecular weight polyhydroxyl compounds and, if desired, c) low molecular weight chain extenders and/or crosslinkers in the presence of d) blowing agents, e) if desired, catalysts, f) additives and g) if desired, auxiliaries, wherein water is used as blowing agent (d) and the additive (f) is selected from the group consisting of at least one compound of the formulae (f1) to (f4)

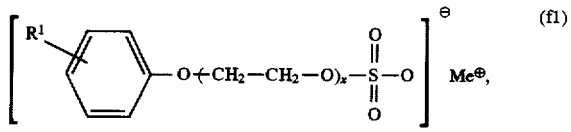

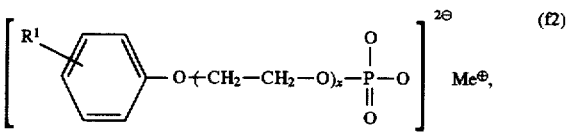

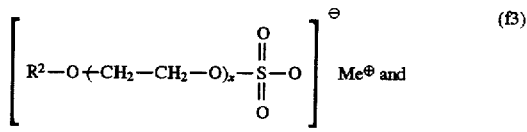

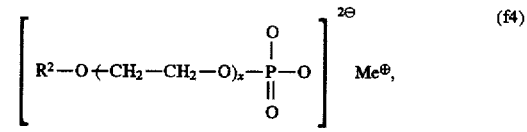

where $R^1$ and $R^2$ are linear or branched alkyl radicals having from 1 to 32 carbon atoms X is an integer from 1 to 35 and Me is sodium, potassium, ammonium, calcium or magnesium, with the proviso that the number of cations and anions is equivalent.

The invention further provides composite elements comprising

A) at least one covering layer which comprises a material selected from the group consisting of polyvinyl chloride, polymer mixtures containing polyvinyl chloride, thermoplastic polyurethanes, polyacrylates and thermoplastic molding compositions comprising acrylate graft copolymers and homopolymers and/or copolymers of olefinically unsaturated monomers, and B) at least one layer of a rigid polyurethane foam or preferably semirigid polyurethane foam which is produced by reacting a) organic and/or modified organic polyisocyanates with b) relatively high molecular weight polyhydroxyl compounds and, if desired, c) low molecular weight chain extenders and/or crosslinkers in the presence of d) water or mixtures of water and physically acting blowing agents as blowing agent (d), e) if desired, catalysts, f) an additive (f) selected from the group consisting of at least one compound having one of the abovementioned formulae (f1) to (f4) and, if desired, additional other additives and g) if desired, auxiliaries.

The use of the additives (f1) to (f4) which are suitable according to the present invention enables the water content of the A component to be considerably increased, for example to water contents of up to 6% by weight, based on the relatively high molecular weight polyhydroxyl compounds (b), without the A component becoming inhomogeneous or turbid, its storage stability being reduced or its viscosity being changed. Fluctuations in the production of the PU foams or composite elements associated with a change, for example impairment, in the mechanical properties were able to be considerably reduced. The range of usable formative components, particularly polyhydroxyl compounds (b), was able to be expanded and the processing latitude of the foamable PU reaction mixtures was able to be widened so that matching of the PU systems to particular foaming equipment became virtually completely dispensable. It is also possible to significantly reduce the void formation, so that the rigid and semirigid PU foams have a uniform cell structure and a uniformly high level of mechanical properties.

The following details may be given regarding the process of the present invention for producing rigid PU foams, preferably semirigid PU foams, and the composite elements produced using such PU foams, and also the starting materials which can be used for this purpose:

a) Suitable organic polyisocyanates for producing the rigid PU foams, preferably semirigid PU foams, are the organic, eg. aliphatic, cycloaliphatic and preferably aromatic, diisocyanates and/or polyisocyanates (a) known per se. Specific examples of aromatic polyisocyanates are: mixtues of diphenylmethane 4,4'- and 2,4'-diisocyanate (MDI), mixtures of MDI and polyphenylpolymethylene polyisocyanates (raw MDI) having an MDI isomer content of advantageously at least 35% by weight, preferably from 50 to 90% by weight and more, based on the total weight of the mixture, tolylene 2,4- and 2,6-diisocyanate (TDI) and the corresponding commercial isomer mixtures, mixtures of TDI and MDI and/or raw MDI, for example those having an MDI content of from 30 to 90% by weight, preferably from 40 to 80% by weight, based on the total weight of the raw MDI.

Also suitable as organic polyisocyanates (a) are modified polyfunctional organic isocyanates, ie. products which are obtained by partial chemical reaction of organic diisocyanates and/or polyisocyanates. Examples which may be mentioned are diisocyanates and/or polyisocyanates containing ester, urea, biuret, allophanate, isocyanurate and preferably carbodiimide, uretonimine and/or urethane groups. Specific examples of suitable modified polyisocyanates are: prepolymers containing urethane groups and having an NCO content of from 14 to 2.8% by weight, preferably from 12 to 3.5% by weight, or pseudoprepolymers having an NCO content of from 35 to 14% by weight, preferably from 34 to 22% by weight, where polyisocyanates from TDI modified with urethane groups have, in particular, an NCO content of from 34 to 28% by weight and those from 4,4'-MDI, 4,4'- and 2,4'-MDI isomer mixtures or raw MDI have, in particular, an NCO content of from 28 to 22% by weight, based on the total weight, and can be prepared by reacting diols, oxyalkylene glycols and/or polyoxyalkylene glycols having molecular weights of from 62 to 6000, preferably from 134 to 4200, with TDI, 4,4'-MDI, MDI isomer mixtures and/or raw MDI, for example at from 20° to 110° C., preferably from 50° to 90° C., with examples of oxyalkylene glycols and polyoxyalkylene glycols which can be used individually or in admixture being: diethylene glycol, dipropylene glycol, polyoxyethylene glycol, polyoxypropylene glycol and polyoxypropylene-polyoxyethylene glycol, polyisocyanates containing carbodiimide groups and/or isocyanurate groups, eg. based on MDI isomers and/or TDI.

However, polyisocyanates which have been found to be particularly useful and are therefore preferably used are mixtures of 4,4'- and 2,4'-MDI, raw MDI having an MDI content of at least 35% by weight, based on the total weight, mixtures of 4,4'- and 2,4'-MDI with 2,4- and 2,6-TDI mixtures, mixtures of raw MDI with 2,4- and 2,6-TDI mixtures, polyisocyanate mixtures containing urethane groups and having an NCO content of from 28 to 14% by weight, based on the total weight, on the basis of TDI and/or MDI and/or raw MDI.

b) Relatively high molecular weight polyhydroxyl compounds used are advantageously those having a functionality of from 2 to 8, a hydroxyl number of from 14 to 500 and above and an alkali metal ion content of less than 10 ppm, preferably less than 5 ppm and in particular less than 3 ppm, where the polyhydroxyl compounds for producing the semirigid PU foams have a functionality of preferably from 2 to 4 and in particular from 2 to 3 and a hydroxyl number of preferably from 14 to 280 and in particular from 24 to 200, and polyhydroxyl compounds for producing rigid PU foams have a functionality of preferably from 3 to 8, in particular from 3 to 6 and a hydroxyl number of from greater than 280 to 500, in particular from 320 to 480. Also suitable are mixtures of polyhydroxyl compounds having a hydroxyl numbers greater than 500, but these advantageously have an average hydroxyl number (number average) within the abovementioned ranges.

Relatively high molecular weight polyhydroxyl compounds which have been found to be useful are, for example, polyoxyalkylene polyols, polyester polyols, advantageously those prepared from alkanedicarboxylic acids and polyhydric alcohols, polythioether polyols, polyesteramides, hydroxyl-containing polyacetals, hydroxyl-containing, preferably aliphatic polycarbonates or mixtures of at least two of the polyhydroxyl compounds mentioned. Preference is given to using polyester polyols and/or, in particular, polyoxyalkylene polyols. To remove lower-boiling by-products, the polyhydroxyl compounds can, after their preparation, be subjected to a treatment at elevated temperature under reduced pressure. An example which may be mentioned is distillation under reduced pressure using a thin-film evaporator.

Suitable polyoxyalkylene polyols can be prepared by known methods, for example by anionic polymerization using alkali metal hydroxides such as sodium or potassium hydroxide or alkali metal alkoxides such as sodium methoxide, sodium or potassium ethoxide or potassium isopropoxide as catalysts with addition of at least one initiator molecule containing from 2 to 8 reactive hydrogen atoms in bonded form, or by cationic polymerization using Lewis acids such as antimony pentachloride, boron fluoride etherate, etc., or bleaching earth as catalysts, from one or more alkylene oxides having from 2 to 4 carbon atoms in the alkylene radical.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures. Examples of suitable initiator molecules are: water, organic dicarboxylic acids such as succinic acid, adipic acid, phthalic acid and terephthalic acid and preferably polyhydric, in particular dihydric to hexahydric alcohols or dialkylene glycols such as ethanediol, 1,2- and 1,3- propanediol, diethylene glycol, dipropylene glycol, 1,4-butanediol, 1,5-pentanediol, 1,6-hexanediol, glycerol, trimethylolpropane, pentaerythritol, sorbitol and sucrose.

For producing the semirigid PU foams, the polyoxyalkylene polyols, preferably polyoxypropylene and polyoxypropylene-polyoxyethylene polyols advantageously have a functionality of preferably from 2 to 4 and in particular from 2 to 3 and hydroxyl numbers of, in particular, from 14 to 200, particularly preferably from 24 to 160, and suitable polyoxytetramethylene glycols usually have a hydroxyl number of from 37 to 180.

Other polyhydroxyl compounds (b) or polyoxyalkylene polyols which have been found to have excellent utility are polyoxyalkylene polyols (b1) or polyoxyalkylene polyol mixtures having a functionality of from 2 to 4, preferably from 2 to 3, and a hydroxyl number of from 14 to 160, preferably from 18 to 80, which are prepared by polyaddition of ethylene oxide, 1,2-propylene oxide or mixtures of ethylene oxide with 1,2-propylene oxide onto at least one initiator molecule of the formula

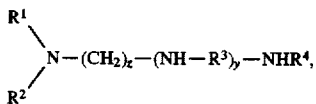

where
R$^1$ and R$^2$ are identical or different, linear or brached C$_1$–C$_4$-alkyl radicals,
both radicals together are a C$_4$–C$_6$-cycloalkylene radical which can contain an —O— or —NR$^5$— bridge in place of a methylene group, where R$^5$ is a C$_1$–C$_4$-alkyl radical, or are identical or different dialkylaminoalkyl radicals of the formula

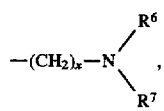

where R$^6$ and R$^7$ are identical or different, linear or branched C$_1$–C$_4$-alkyl radicals or both radicals together are a C$_4$–C$_6$-cycloalkylene radical which can contain a bonded —O— or —NR$^5$— bridge in place of a methylene group, and X is an integer of at least 3, z is an integer of at least 3, R$^3$ is a C$_2$–C$_4$-alkylene group, y is zero or a number from 1 to 3 and R$^4$ is hydrogen or a C$_1$–C$_4$-alkyl radical, with the proviso that R$^4$ is hydrogen when y is equal to zero.

Very suitable polyoxyalkylene polyols (b1) having a functionality of from 2 to 3 and a hydroxyl number of from 14 to 160, preferably from 18 to 80, can be prepared, for example, by polyaddition of at least one alkylene oxide, preferably ethylene oxide, 1,2-propylene oxide or mixtures of ethylene oxide and 1,2-propylene oxide, onto an initiator molecule selected from the group consisting of N,N-dimethyl-1,3-diaminopropane, N,N-dimethyl-1,4-diaminobutane and in particular N,N-dimethyldipropylenetriamine. Such highly reactive polyoxyalkylene polyols (b1) in which the tertiary amino group is bonded via a spacer bridge comprising at least 3 methylene radicals to the —NH— and/or —NH$_2$— groups which react with alkylene oxide are described EP-A-0 539 819 whose entire disclosure is incorporated by reference into the description of the present invention.

Other polyhydroxyl compounds (b) or polyoxyalkylene polyols which have been found to have excellent utility are block polyoxypropylene-polyoxyethylene polyols (b2) or block polyoxypropylene-polyoxyethylene polyol mixtures having a hydroxyl number of from 14 to 65, preferably from 14 to 40 and in particular from 20 to 35, and a content of terminal ethylene oxide units of from 2 to 9% by weight, preferably 3 to 8% by weight and in particular from 5 to 7% by weight, based on the weight of the polyoxypropylene units, which are prepared by anionic polymerization at elevated temperatures of 1,2-propylene oxide onto an initiator molecule mixture having an average functionality of from 2.3 to 2.8, preferably from 2.3 to 2.7 and in particular from 2.5 to 2.7, and comprising water and glycerol and/or trimethylolpropane, and polymerization of ethylene oxide onto the polyoxypropylene adduct obtained. Block polyoxypropylene-polyoxyethylene polyols (b2) of said type are known from EP-A-433 878 and EP-A-433 889 whose entire descriptions are incorporated by reference into the description of the present invention.

Further suitable polyoxyalkylene polyols are polymer-modified polyoxyalkylene polyols (b3), preferably graft polyoxyalkylene polyols, in particular those based on styrene and/or acrylonitrile prepared by in situ polymerization of acrylonitrile, styrene or preferably mixtures of styrene and acrylonitrile, eg. in a weight ratio of from 90:10 to 10:90, preferably from 70:30 to 30:70, advantageously in the abovementioned polyoxyalkylene polyols using a method similar to those given in German Patents 11 11 934, 12 22 669 (U.S. Pat. Nos. 3,304,273, 3,383,351, 3,523,093), 11 52 536 (GB 10 40 452) and 11 52 537 (GB 987 618), and also polyoxyalkylene polyol dispersions which contain as dispersed phase, usually in an amount of from 1 to 50% by weight, preferably from 2 to 25% by weight: for example, polyureas, polyhydrazides, polyurethanes containing bonded tert-amino groups and/or melamine, and which are described, for example, in EP-B-011 752 (U.S. Pat. No. 4,304,708), U.S. Pat. No. 4,374,209 and DE-A-32 31 497.

The polyoxyalkylene polyols can be used individually or in the form of mixtures. Polyhydroxyl compounds which have been found to have excellent utility are mixtures containing polyoxyalkylene polyols (b1) and (b2), with these advantageously being present in the mixture in an amount of from 2 to 50% by weight, preferably from 8 to 48% by weight, of (b1) and from 10 to 50% by weight, preferably from 20 to 48% by weight, of (b2), based on the total weight.

Other polyhydroxyl compounds (b) which can be used are polyester polyols which can be prepared, for example, from alkanedicarboxylic acids having from 2 to 12 carbon atoms, preferably alkanedicarboxylic acids having from 4 to 6 carbon atoms, or mixtures of alkanedicarboxylic acids and/or aromatic polycarboxylic acids and polyhydric alcohols, preferably alkanediols, having from 2 to 12 carbon atoms, preferably from 2 to 6 carbon atoms, and/or dialkylene glycols. Examples of suitable alkanedicarboxylic acids are: succinic acid, glutaric acid, adipic acid, suberic acid, azelaic acid, sebacic acid and decanedicarboxylic acid. Suitable aromatic polycarboxylic acids are, for example, phthalic acid, isophthalic acid and terephthalic acid. The alkanedicarboxylic acids can here be used either individually or in admixture with one another. In place of the free dicarboxylic acids, it is also possible to use the corresponding dicarboxylic acid derivatives such as dicarboxylic monoesters or diesters of alcohols having from 1 to 4 carbon atoms or dicarboxylic anhydrides. Preference is given to using dicarboxylic acid mixtures of succinic, glutaric and adipic acid in weight ratios of, for example, 20–35:35–50:20–32, and in particular adipic acid. Examples of dihydric and polyhydric alcohols, in particular alkanediols or dialkylene glycols are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol, 1,6-hexanediol or mixtures of at least two of the diols specified, in particular mixtures of 1,4-butanediol, 1,5-pentanediol and 1,6-hexanediol. It is also possible to use polyester polyols from lactones, eg. ε-caprolactone or hydroxycarboxylic acids, eg. ω-hydroxycaproic acid.

To prepare the polyester polyols, the mixtures of aromatic and aliphatic dicarboxylic acids and preferably alkanedicarboxylic acids and/or derivatives and polyhydric alcohols can be polycondensed in the absence of catalysts or preferably in the presence of esterification catalysts, advantageously in an atmosphere of inert gases such as nitrogen, helium, argon, etc., in the melt at from 150° to 250° C., preferably from 180° to 220° C., at atmospheric pressure or under reduced pressure to the desired acid number which is advantageously less than 10, preferably less than 2. According to a preferred embodiment, the esterification mixture is polycondensed at the abovementioned temperatures to an acid number of from 80 to 30, preferably from 40 to 30, at atmospheric pressure and subsequently at a pressure of less than 500 mbar, preferably from 50 to 150 mbar. Suitable esterification catalysts are, for example, iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene for azeotropically distilling off the water of condensation.

To prepare the polyester polyols, the organic polycarboxylic acids and/or derivatives and polyhydric alcohols are advantageously polycondensed in a molar ratio of 1:1–1.8, preferably 1:1.05–1.2.

The polyester polyols obtained preferably have a functionality of from 2 to 4, in particular from 2 to 3, and a hydroxyl number of from 25 to 200, preferably from 32 to 140 and in particular from 40 to 94.

Suitable hydroxyl-containing polyacetals are, for example, the compounds which can be prepared from glycols such as diethylene glycol, triethylene glycol, 4,4'-dihydroxyethoxydiphenyldimethylmethane and hexanediol, and formaldehyde. Suitable polyacetals can also be prepared by polymerization of cyclic acetals.

Suitable hydroxyl-containing polycarbonates are, for example, those of the type known per se which can be prepared, for example, by reacting diols such as 1,3-propanediol, 1,4-butanediol and/or 1,6-hexanediol, diethylene glycol, triethylene glycol or tetraethylene glycol with diaryl carbonates, eg. diphenyl carbonate, or phosgene.

The polyesteramides include, for example, the predominantly linear condensates obtained from polybasic, saturated and/or unsaturated carboxylic acids or their anhydrides and polyfunctional saturated and/or unsaturated aminoalcohols or mixtures of polyhydric alcohols and amino alcohols and/or polyamines.

c) To produce the rigid and preferably semirigid PU foams by the process of the present invention, it is also possible to use, if desired, low molecular weight difunctional chain extenders, low molecular weight trifunctional or higher-functional, preferably trifunctional or tetrafunctional, crosslinkers or mixtures of chain extenders and crosslinkers in addition to the relatively high molecular weight polyhydroxyl compounds (b).

Suitable chain extenders and crosslinkers (c) of this type are, for example, diols such as (cyclo)alkanediols and dialkylene glycols and/or higher-hydric alcohols, preferably triols and tetrols, havig molecular weights of less than 400, preferably from 60 to 300. Examples of suitable polyhydric alcohols are aliphatic, cycloaliphatic and/or araliphatic diols having from 2 to 14 carbon atoms, preferably from 4 to 10 carbon atoms, for example ethylene glycol, 1,3-propanediol, 1,10-decanediol, o-, m- or p-dihydroxycyclohexane, diethylene glycol, dipropylene glycol and preferably 1,4-butanediol, 1,6-hexanediol and bis(2-hydroxyethyl)hydroquinone and triols such as 1,2,4- and 1,3,5-trihydroxycyclohexane, glycerol and trimethylolpropane. Further suitable chain extenders and crosslinkers are low molecular weight hydroxyl-containing polyalkylene oxides having molecular weights up to 400 and based on ethylene and/or 1,2-propylene oxide and the abovementioned examples of diols and/or triols and/or pentaerythritol, sorbitol and sucrose as initiator molecules.

The commercial relatively high molecular weight polyhydroxyl compounds (b) and any low molecular weight chain extenders and/or crosslinkers used usually have an alkali metal ion content of less than 10 ppm. As crosslinkers (c) in the process of the present invention, in particular for producing the semirigid PU foams, it has also been found to be useful to use polyoxyalkylene polyols having a functionality of from 3 to 8, preferably from 3 to 6, and in particular 3, a hydroxyl number of from 210 to 1300, preferably from 240 to 970 and in particular from 350 to 750, and an alkali metal ion content, preferably potassium ions, of from 150 to 1200 ppm, preferably from 150 to 800 ppm and in particular from 400 to 600 ppm. The use of alkali metal-rich crosslinkers of this type for preparing preferably semirigid PU foams is known and is comprehensively described, for example, in EP-A-0 624 611 (CA-A-2 122 973).

If mixtures of relatively high molecular weight polyhydroxyl compounds (b) and chain extenders and/or crosslinkers (c) are used, for example for modifying the mechanical properties such as the hardness, these advantageously contain the chain extenders and/or crosslinkers (c) in an amount of from 0.5 to 20% by weight, preferably from 1 to 15% by weight and in particular from 2 to 8% by weight.

d. According to the present invention, water is used as blowing agent (d) for producing the rigid and preferably semirigid PU foams, this reacting with isocyanate groups to form amine groups and carbon dioxide, the actual blowing gas. The amounts of water which are advantageously used are from 0.1 to 5 parts by weight, preferably from 1.5 to 3.5 parts by weight and in particular from 2.0 to 3.0 parts by weight, based on 100 parts by weight of the polyhydroxyl compounds (b) or mixtures of relatively high molecular weight polyhydroxyl compounds (b) and chain extenders and/or crosslinkers (c).

It has here been found to be advantageous to dissolve the additives (f1), (f2), (f3) and/or (f4) in water as blowing agent (d) and to use these formative components essential to the present invention in the form of an aqueous solution.

As blowing agent (d), the water can also be mixed with physically acting blowing agents. Suitable physically acting blowing agents are liquids which are inert toward the organic, modified or unmodified polyisocyanates (a) and have boiling points below 100° C., preferably below 50° C., in particular from −50° C. to 30° C., at atmospheric pressure, so that they vaporize under the action of the exothermic polyaddition reaction. Examples of such preferred liquids are hydrocarbons such as n- and iso-pentane, preferably industrial mixtues of n- and iso-pentane, n- and iso-butane, n- and iso-propane, cycloalkanes such as cyclohexane and cyclopentane, ethers such as furan, dimethyl ether and diethyl ether, ketones such as acetone and methyl ethyl ketone, alkyl carboxylates such as methyl formate, dimethyl oxalate and ethyl acetate and halogenated hydrocarbons such as methylene chloride, dichloromonofluoromethane, difluoromethane, difluorochloromethane, trifluoromethane, difluoroethane, tetrafluoroethane, heptafluoropropane, 1-chloro-2,2-difluoroethane (142), 1-chloro-1,1-difluoroethane (142b) and 1-chloro-1,2-difluoroethane (142a). It is also possible to use mixtures of these low-boiling liquids with one another, eg. mixtures of difluorochloromethane and 142b, and/or with other substituted or unsubstituted hydrocarbons.

The amount of physically acting blowing agent required in addition to water can be determined in a simple manner as a function of the desired foam density and is from about 0 to 25 parts by weight, preferably from 1 to 25 parts by weight, in particular from 2 to 15 parts by weight, per 100 parts by weight of the polyhydroxyl compounds (b). It may be advantageous to mix the modified or unmodified polyisocyanates (a) with the inert, physically acting blowing agents and thereby reduce the viscosity.

The rigid and preferably semirigid PU foams can be produced by the process of the present invention in the absence of catalysts. However, the reaction is advantageously carried out in the presence of catalysts (e) which strongly accelerate the reaction of the organic and/or organic modified polyisocyanates (a) with the polyhydroxyl compounds (b) and crosslinkers (c). Suitable catalysts are, for example, low-fogging blowing catalysts. Further examples of suitable catalysts are alkali metal salts of monocarboxylic acids having linear or branched alkyl radicals of from 1 to 20 carbon atoms, preferably from 1 to 18 carbon atoms, and/or dicarboxylic acids having linear or branched alkyl radicals of from 2 to 20 carbon atoms, preferably from 2 to 12 carbon atoms, for example potassium formate, potassium acetate, potassium octoate, potassium maleate and dipotassium adipate, and organic metal compounds, preferably organic tin compounds such as tin(II) salts of organic carboxylic acids, eg. tin(II) diacetate, tin(II) dioctoate, tin(II) diethylhexanoate and tin(II) dilaurate, and the dialkyltin(IV) salts of organic carboxylic acids, eg. dibutyltin diacetate, dibutyltin dilaurate, dibutyltin maleate and dioctyltin diacetate. Such catalysts are described, for example, in DE-A-3 048 529. Other catalysts which have been found to be well suited are dialkyltin(IV) mercapto compounds such as bislauryltin(IV) dimercaptide and compounds of the general formulae $R_2Sn(SR'\text{—}O\text{—}CO\text{—}R'')_2$ or $R_2Sn(SR'\text{—}CO\text{—}OR'')_2$, where R is an alkyl radical having at least 8 carbon atoms, R' is an alkyl radical having at least 2 carbon atoms and R" is an alkyl radical having at least 4 carbon atoms. Examples which may be mentioned of catalysts of this type, which are described, for example, in DD-A-218 668, are: dioctyltin bis(ethylene thioglycol laurate), dioctyltin bis(2-ethylhexyl thiol acetate), dioctyltin bis(hexyl thiol acetate) and dioctyltin bis(lauryl thiol acetate). Further catalysts which have been found to be very useful are organotin compounds having tin-oxygen or tin-sulfur bonds, as are described, for example, in DD-A-244 535, of the general formulae $(R_3Sn)_2O$, $R_2SnS$, $(R_3Sn)_2S$, $R_2Sn(SR')_2$, or $RSn(SR')_3$, where R and R' are alkyl groups containing from 4 to 8 carbon atoms in the case of R and from 4 to 12 carbon atoms in the case of R' and R' can also be one of the radicals —R"COOR" and —R"OCOR'", where R'" are alkylene groups having from 4 to 12 carbon atoms. Examples are: bis(tributyltin) oxide, dibutyltin sulfide, dioctyltin sulfide, bis(tributyltin) sulfide, dibutyltin bis(2-ethylhexyl thioglycolate), dibutyltin bis(2-ethylhexyl thioglycolate), dioctyltin bis(2-ethylhexyl thioglycolate), dioctyltin bis(2-ethylhexyl thioglycolate), dioctyltin bis(ethylene thioglycol 2-ethylhexanoate) and dibutyltin bis(ethylene thioglycol laurate). Catalysts which are preferably used are mono-n-octyltin (2-ethylhexyl thioglycolate), di-n-octyltin bis(2-ethylhexyl thioglycolate) and dibutyltin dilaurate.

The organic metal compounds can be used as catalysts either individually or in the form of catalyst combinations. A combination which has been found to be extremely advantageous is one consisting of 50% by weight of mono-n-octyltin (2-ethylhexyl thioglycolate) and 50% by weight of di-n-octyltin bis(2-ethylhexyl thioglycolate).

The catalysts are usually used in an amount of from 0.001 to 0.2 parts by weight, preferably from 0.005 to 0.015 parts by weight, per 100 parts by weight of the polyhydroxyl compounds (b).

f) To prepare the rigid and preferably semirigid PU foams, use is made as additive (f) essential to the present invention of at least one compound which is selected from the group consisting of compounds of the formulae (f1) to (f4)

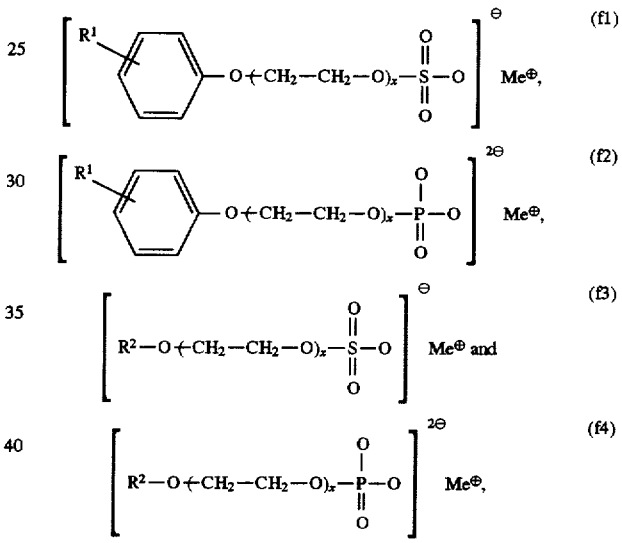

where

R$^1$ is a linear or branched alkyl radical having from 1 to 32 carbon atoms, preferably from 2 to 18 carbon atoms and in particular from 6 to 18 carbon atoms, R$^2$ is a linear or branched alkyl radical having from 1 to 32 carbon atoms, preferably from 4 to 24 carbon atoms and in particular from 8 to 20 carbon atoms, X is an integer from 1 to 35, preferably from 10 to 30 and in particular from 20 to 30, and Me is sodium, potassium, ammonium, calcium or magnesium, with the proviso that the number of cations and anions is equivalent.

Examples of suitable compounds of this type are

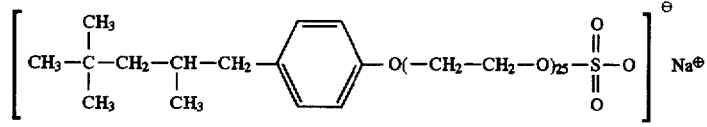

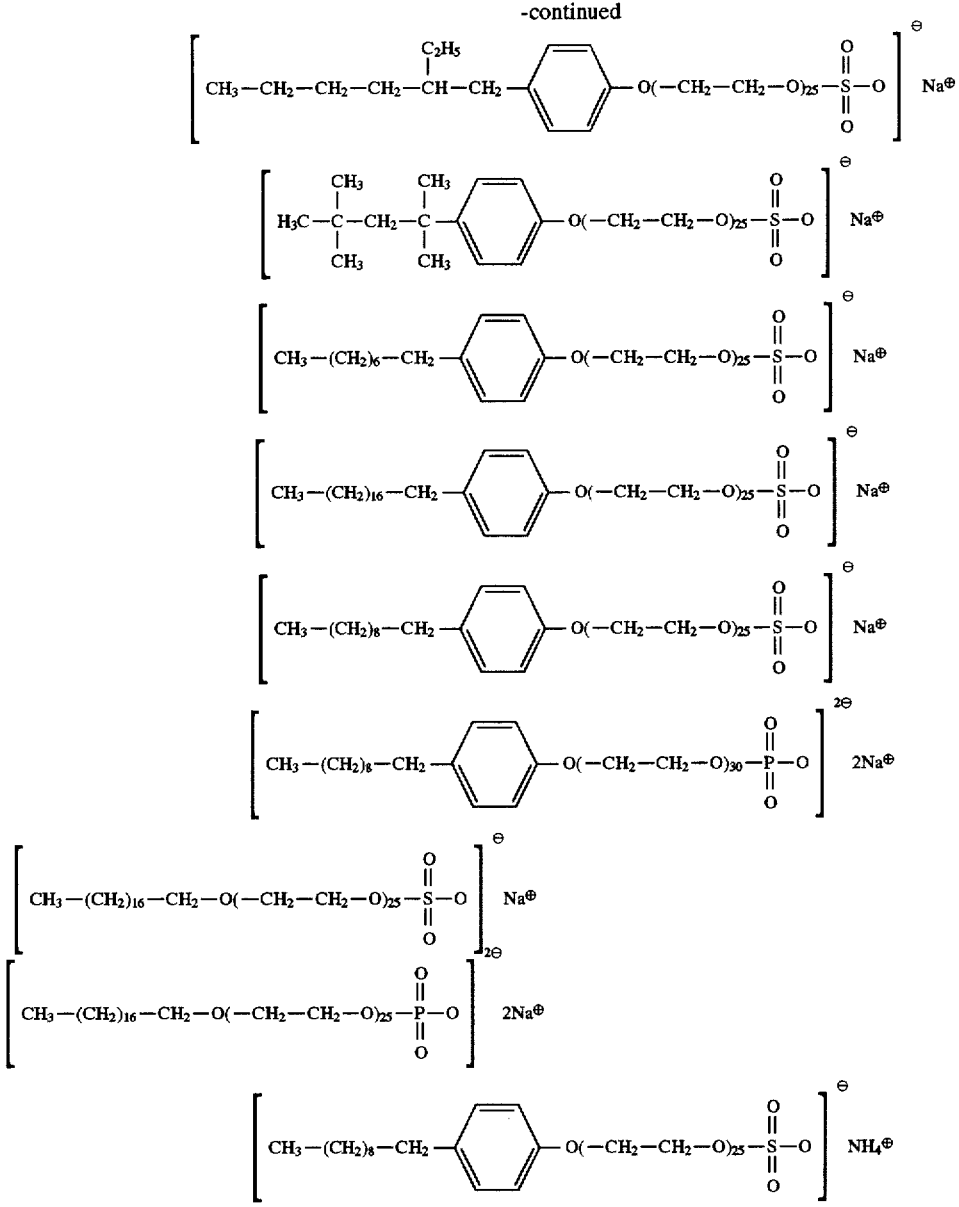

-continued

The compounds can be prepared, for example, according to known methods by addition of ethylene oxide onto alcohols or alkylphenols, introduction of the anionic group, for example by reaction with liquid sulfur trioxide, and neutralization of the reaction product with aqueous sodium hydroxide solution.

Depending on their activity, which can easily be determined by simple experiments taking into consideration the other formative components present in the A component, in particular the relatively high molecular weight polyhydroxyl compounds, and is recognizable by the formation of a homogeneous A component, it has been found to be advantageous to use the additives (f1), (f2), (f3) and (f4) or mixtures of at least two of these additives (f1) to (f4) in an amount of usually from 0.01 to 2.5% by weight, preferably from 0.3 to 1.4% by weight and in particular from 0.4 to 1.0% by weight, based on the weight of the relatively high molecular weight polyhydroxyl compounds (b).

Further additives (f) which have been found to be suitable are inorganic acids, organic acids or mixtures of inorganic and organic acids which are advantageously used in combination with polyoxyalkylene polyols (b1) as relatively high molecular weight polyhydroxyl compounds (b) and/or with crosslinkers (c) having a high content of alkali metal ions.

Suitable inorganic acids are, for example, polyphosphoric acids, monobasic and polybasic phosphoric acids, preferably triphosphoric acid and hydrochloric acid. Preference is given to using organic acids, in particular those selected from the group consisting of monocarboxylic acids, polycarboxylic acids, preferably dicarboxylic acids and aromatic sulfonic acids. Examples which may be mentioned of organic acids are monocarboxylic and dicarboxylic acids such as formic acid, acetic acid, propionic acid and preferably ricinoleic acid, oxalic acid, succinic acid, maleic acid, fumaric acid, tartaric acid, citric acid, adipic acid, benzoic acid, phthalic acid, terephthalic acid and isophthalic acid, and sulfonic acids such as benzenesulfonic acid and p-toluenesulfonic acid. The inorganic and/or organic acids are, depending on their $pK_a$ and molecular weight and also the basicity of the polyhydroxyl compounds (b), usually used in an amount of from 0.1 to 20 parts by weight, based on 100 parts by weight of polyhydroxyl compound (b), with the exact weight quantities being able to be determined by simple experiments.

When using at least one polyoxyalkylene polyol (b1) as polyhydroxyl compound (b), it has been found to be advantageous to introduce the inorganic and/or organic acids into the polyoxyalkylene polyol (b1) in a separate reaction step and to incorporate the mixture obtained into the A component.

Organic acids which have been found to be useful are, in particular, long-chain fatty acids such as ricinoleic acid and hydroxy-fatty acids, eg. hydroxystearic acids, which can be obtained from the acids of natural oils by epoxidation of the unsaturated double bonds and addition of monohydric and/or polyhydric alcohols onto the epoxide group to give hydroxy-fatty acids. Such hydroxyl-containing organic acids have been found to be useful, particularly in combination with crosslinkers (c) having a high content of alkali metal ions, since this combination has an excellent emulsifying action and gives PU foams having an extremely homogeneous foam structure. When using a crosslinker (c) having an alkali metal ion content of less than 10 ppm in combination with the organic acids, the initiation time of the reaction mixture is prolonged.

g) If desired, it is possible to additionally incorporate auxiliaries (g) into the reaction mixture for producing the rigid PU foams, preferably semirigid PU foams. Examples which may be mentioned are surface-active substances, foam stabilizers, cell regulators, fillers, dyes, pigments, flame retardants, hydrolysis inhibitors, fungistatic and bacteriostatic substances.

Possible surface-active substances are, for example, compounds which serve to aid the homogenization of the starting materials and may also be suitable for regulating the cell structure. Examples which may be mentioned are, emulsifiers such as the sodium salts of castor oil sulfates or of fatty acids and also amine salts of fatty acids, eg. diethylamine oleate, diethanolamine stearate, diethanolamine ricinoleate, salts of sulfonic acids, eg. alkali metal or ammonium salts of dodecylbenzene- or dinaphthylmethanedisulfonic acid and ricinoleic acid; foam stabilizers such as siloxane-oxyalkylene copolymers and other organopolysiloxanes, ethoxylated alkylphenols, ethoxylated fatty alcohols, paraffin oils, castor oil or ricinoleic esters, Turkey red oil and peanut oil, and cell regulators such as paraffins, fatty alcohols and dimethylpolysiloxanes. Oligomeric polyacrylates having polyoxyalkylene and fluoroalkane radicals as side groups are also suitable for improving the emulsifying action, the cell structure and/or stabilizing the foam. The surface-active substances are usually used in amounts of from 0.01 to 5 parts by weight, based on 100 parts by weight of the polyhydroxyl compounds (b) and crosslinkers (c).

For the purposes of the present invention, fillers, in particular reinforcing fillers, are the customary organic and inorganic fillers and reinforcements known per se. Specific examples are: inorganic fillers such as siliceous minerals, for example sheet silicates such as antigorite, serpentine, hornblendes, amphiboles, chrysotile, zeolites, talc; metal oxides such as kaolin, aluminum oxides, aluminum silicate, titanium oxides and iron oxides, metal salts such as chalk, barite and inorganic pigments such as cadmium sulfide, zinc sulfide, and also glass particles. Suitable organic fillers are, for example: carbon black, melamine, rosin, cyclopentadienyl resins and graft polymers.

The inorganic and organic fillers can be used individually or as mixtures and are advantageously incorporated into the reaction mixture in amounts of from 0.5 to 50% by weight, preferably from 1 to 40% by weight, based on the weight of the components (a) to (c).

Suitable flame retardants are, for example, tricresyl phosphate, tris(2-chloroethyl) phosphate, tris(2-chloropropyl) phosphate, tris(1,3-dichloropropyl) phosphate, tris(2,3-dibromopropyl) phosphate and tetrakis (2-chloroethyl)ethylene diphosphate.

Apart from the halogen-substituted phosphates mentioned above, it is also possible to use inorganic flame retardants such as red phosphorus, aluminium oxide hydrate, antimony trioxide, ammonium sulfate, ammonium polyphosphate and calcium sulfate, expanded graphite, urea or cyanuric acid derivatives such as melamine, melamine cyanurate or mixtures of at least two flame retardants, for example ammonium polyphosphates and melamine and also, if desired, expanded graphite and/or starch for making the PU foams produced according to the present invention flame resistant. In general, it has been found to be advantageous to use from 5 to 50 parts by weight, preferably from 5 to 25 parts by weight, of the specified flame retardants or mixtures per 100 parts by weight of the components (a) to (c).

As auxiliaries (g), use can also be made of antioxidants, for example nonvolatile cryptophenols, eg. Irganox® 1135 from Ciba-Geigy AG, or sterically hindered amines, eg. Naugard® 445 from Uniroyal. In addition to these antioxidants, use can advantageously also be made of UV stabilizers or UV stabilizer combinations.

Details regarding the abovementioned other customary auxiliaries can be found in the specialist literature, for example the monograph by J. H. Saunders and K. C. Frisch "High Polymers", Volume XVI, Polyurethanes, Parts 1 and 2, Interscience Publishers 1962 or 1964, or Kunststoff-Handbuch, Polyurethane, Volume VII, Carl-Hanser-Verlag, Munich, Vienna, 1st and 2nd edition, 1966 and 1983.

To produce the rigid PU foams, preferably the semirigid PU foams, the organic, modified or unmodified polyisocyanates (a), the polyhydroxyl compounds (b) and crosslinkers (c) are reacted in the presence of the blowing agents (d), if desired catalysts (e) and additives (f) and also, if desired, auxiliaries (g), usually at from 0° to 120° C., preferably from 15° to 100° C. and in particular from 18° to 80° C., in such amounts that advantageously from 0.5 to 2, preferably from 0.8 to 1.3 and in particular approximately one, hydroxyl group bonded to (b) and (c) are present per NCO group. If water is used as sole blowing agent or as part of the blowing agent, it has been found to be advantageous to set a ratio of equivalents of water to equivalents of NCO groups in the range of advantageously 0.5–5:1, preferably 0.7–0.95:1 and in particular from 0.75–0.85:1. To produce rigid PU foams containing isocyanurate groups, a ratio of NCO:OH groups of 2–25:1, preferably 2–10:1 and in particular 2–5:1 has been found to be useful.

The PU foams, preferably the semirigid PU foams, are advantageously produced by the one-shot process by mixing two components A and B, with the starting components (b) to (d) and (f) and also, if desired, (e) and (g) being combined to give the A component and the organic and/or modified organic polyisocyanates (a), if desired in admixture with inert, physically acting blowing agents being used as B component. The A and B components only have to be intensively mixed before production of the PU foams. The reaction mixture can be foamed and allowed to cure in open or closed molds. Furthermore, prefabricated components can be backfoamed to give moldings and composite elements can be produced.

The process of the present invention is also particularly suitable for producing molded PU foams. For this purpose, the reaction mixture is introduced at from 15° to 80° C., preferably from 30° to 65° C., into an advantageously metal mold which can be heated. The mold temperature is usually from 20° to 90° C., preferably from 35° to 70° C. The reaction mixture is usually allowed to cure in the closed mold without application of pressure or with compaction, eg. at degrees of compaction of from 1.1 to 8, preferably from 2 to 6 and in particular from 2.2 to 4.

The PU foams produced by the process of the present invention usually have densities of from 0.025 to 0.25 g/cm³, preferably from 0.035 to 0.08 g/cm³, with the molded foams, for example those having a cellular core and a compacted surface zone, also being able to have densities of from 0.08 to 0.75 g/cm³, preferably from 0.2 to 0.6 g/cm³, depending on the degree of compaction employed. The PU foams produced by the process of the present invention are, as already indicated, essentially free of odor, have a uniform, essentially void-free cell structure and have a uniformly high level of mechanical properties.

The reaction mixtures for producing the PU foams are used, for example, in the vehicle industry, for example the automobile, aircraft and ship-building industries, the refrigeration appliance and building industries for filling hollow spaces with foam and backfoaming hollow spaces, eg. of dashboards and instrument panels, as intermediate layer for sandwich elements or for filling the housings of refrigerators and freezer chests with foam. The PU foams are suitable as insulation materials, eg. as insulating shells for pipes or heating equipment. They are also used as wall linings, components of housings, upholstery materials, armrests, headrests, sun visors, gloveboxes or compartments and safety coverings.

As already stated, the rigid and preferably semirigid PU foams produced by the process of the present invention find preferred use for producing composite elements having at least 2 covering layers or of other moldings by backfoaming a prefabricated component. Such composite elements comprise A) at least one covering layer and
B) at least one layer, eg. a core layer or reinforcing layer, of a rigid or semirigid PU foam which is produced by reacting
  a) at least one organic and/or modified organic polyisocyanate with
  b) at least one relatively high molecular weight polyhydroxyl compound, preferably a polyhydroxyl compound having a functionality of from 2 to 8 and a hydroxyl number of from 14 to 500 and, if desired,
  c) at least one low molecular weight difunctional chain extender and/or low molecular weight, trifunctional or higher-functional crosslinker, eg. one having a molecular weight of below 400, preferably from 60 to 300,
  in the presence of
  d) water or a mixture of water and at least one physically acting blowing agent as blowing agent (d),
  e) if desired, catalysts,
  f) an additive (f) selected from the group consisting of a compound of the formula (f1), (f2), (f3) and (f4) or a mixture of at least 2 of the specified compounds (f1) to (f4), and also, if desired, additional other additives and
  g) if desired, auxiliaries.

As covering layers (A), use can be made of materials known per se such as paper, wood, plastics, natural fibers, synthetic fibers or metals in the form of films, mats, nonwovens and woven fabrics. Examples of materials which have been found to be very useful and are therefore preferably used are: polyvinyl chloride, polymer mixtures containing polyvinyl chloride, thermoplastic polyurethanes, polyacrylates and thermoplastic molding compositions comprising acrylate graft copolymers and homopolymers and/or copolymers of olefinically unsaturated monomers, as are described, for example, in the German Patent Applications P 44 10 883.4 and P 44 37 501.8.

The composite elements can be produced by known methods, for example the processes described in Kunststoff-Handbuch, Volume 7, Polyurethane, 2nd edition (edited by Dr. G. Oertel, 1983, Carl Hanser-Verlag, Munich, Vienna) or by a method similar to those described in EP-A-0 490 145.

EXAMPLES

Example 1

A component: a mixture consisting of 43.38 parts by weight of a block polyoxypropylene-polyoxyethylene polyol initiated using a mixture of glycerol and water in a weight ratio of 1:0.98 and having a hydroxyl number of 30, a content of terminal ethylene oxide units of 5.9% by weight, based on the weight of the propylene oxide units, and about 70% of primary hydroxyl groups, 43.2 parts by weight of a polyoxypropylene(86.5% by weight)-polyoxyethylene(13.5% by weight) polyol initiated using N,N-dimethylaminodipropylenetriamine and having a hydroxyl number of 35, 3.0 parts by weight of a graft polyether polyol having a hydroxyl number of 28, prepared by a free-radical in situ polymerization from a glycerol-initiated polyoxypropylene-polyoxyethylene polyol as graft base and a mixture of styrene and acrylonitrile in a weight ratio of 12:8 to form the material grafted on (Lupranol® ℓ 4100 from BASF AG), 4.0 parts by weight of a glycerol-initiated polyoxyethylene polyol having a hydroxyl number of 525 and a potassium content of 470 ppm, 1.6 parts by weight of ricinoleic acid, 0.2 parts by weight of potassium acetate (40% strength by weight in ethylene glycol), 0.08 parts by weight of a mixture of 50% by weight of di-n-octyltin bis(2-ethylhexyl thioglycolate) and 50% by weight of mono-n-acetyltin tris(2-ethylhexyl thioglycolate), 3.54 parts by weight of a 65% strength by weight aqueous solution of

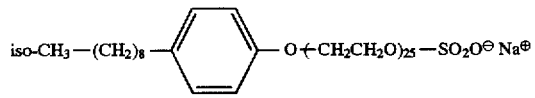

and 1.0 parts by weight of a sterically hindered amine (Naugard® 445 from Uniroyal)

B component:

A mixture of diphenylmethane diisocyanates and polyphenylpolymethylene polyisocyanates (raw MDI) having an NCO content of 31.3% by weight, which, based on the total weight, contained: 37% by weight of 4,4'-MDI and 2% by weight of 2,4'-MDI.

To produce a semirigid PU foam, 100 parts by weight of the A component and 45.1 parts by weight of the B component were intensively mixed by stirring at 23° C., the reaction mixture was placed in an open mold and allowed to foam freely therein. This gave a semirigid PU foam having a density of 62.9 g/l.

The following foaming data were measured during foaming:

start time: 12 seconds rise time: 82 seconds

To backfoam a dashboard, a covering film of PVC/ABS was laid into a metal mold heated to from 40° to 43° C.

Backfoaming was carried out by means of a Hennecke foaming apparatus using an MQ mixing head, the throttle setting 5, nozzles having a diameter of 1.3 mm for the A component and 0.8 mm for the B component and a discharge rate of 223 g/sec. The shot time was from 4.2 to 5.05 seconds, which corresponds to a discharge of from 920 to 1126 g.

To produce the backfoaming, the A component at 33° C. under a pressure of 200 bar and the B component at 30° C. and under a pressure of 200 bar were mixed in a weight ratio of 100:45.1, the reaction mixture was injected into the closed mold and allowed to foam therein. The molding was removed from the mold after 3 minutes.

Using said process, 10 dashboards were backfoamed without voids. After storage at 80° C. for 1 hour, no sink marks could be found on the dashboards.

EXAMPLE 2

A component: a mixture consisting of 42.95 parts by weight of a polyoxypropylene(86.5% by weight)-polyoxyethylene(13.5% by weight) polyol initiated using N,N-dimethyldipropylenetriamine and having a hydroxyl number of 35, 42.11 parts by weight of a block polyoxypropylene-polyoxyethylene polyol initiated using an initiator molecular mixture of glycerol and water in a weight ratio of 1:0.98 and having a hydroxyl number of 30, a content of terminal ethylene oxide units of 5.9% by weight, based on the weight of the polyoxypropylene units, and containing about 70% of primary hydroxyl groups, 3.3 parts by weight of a graft polyether polyol having a hydroxyl number of 28, prepared by a free-radical in situ polymerization from a glycerol-initiated polyoxypropylene-polyoxyethylene polyol as graft base and a mixture of styrene and acrylonitrile in a weight ratio of 12:8 to form the material grafted on (Lupranol® 4100)

4.0 parts by weight of a glycerol-initiated polyoxyethylene polyol having a hydroxyl number of 525 and a potassium ion content of 470 ppm, 1.0 parts by weight of a glycerol-initiated block polyoxyethylene(62.5% by weight)-polyoxypropylene(27.5% by weight)-polyoxyethylene(10% by weight) polyol having a hydroxyl number of 42, 0.1 parts by weight of a 40% strength by weight potassium acetate solution in ethylene glycol, 2.0 parts by weight of a polyoxypropylene polyol initiated using technical grade tripropylenetetramine and having a hydroxyl number of 323, 3.54 parts by weight of a 65% strength by weight aqueous solution of

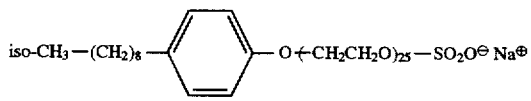

and 1.0 parts by weight of a sterically hindered amine (Naugard® 445).

B component: as described in Example 1.

To produce a semirigid PU foam, 100 parts by weight of the A component and 45.67 parts by weight of the B component were intensively mixed while stirring at 23° C., the reaction mixture was placed in a open mold and allowed to foam freely therein. This gave a semirigid PU foam having a density of 71 g/l.

The following foaming data were measured during foaming:

start time: 14 seconds rise time: 86 seconds

The backfoaming of a dashboard was carried out by a method similar to that described in Example 1, but the weight ratio of A:B component was 100:45.7.

The dashboard was removed from the mold after 2.5 minutes.

After storage at 80° C. for 1 hour, no sink marks could be found on the dashboard. The fogging value in accordance with DIN 75 201, method B, was 0.03 mg.

EXAMPLE 3

Preparation of an additive (f2)

21.29 g (0.15 mol) of phosphorus pentoxide were added in portions to 401.29 g (0.3 mol) of an adduct of 1 mol of iso-nonylphenol and 25 mol of ethylene oxide, which had been melted at 90° C., over a period of 4 hours while stirring, with a maximum reaction temperature of 130° C. not being exceeded, and the mixture was stirred further for about 30 minutes until a clear solution was formed. The clear solution was allowed to cool to 60° C., 1358.88 g of water were added while stirring and the pH was adjusted to 7 using 95.0 g (0.475 mol) of a 20% strength by weight aqueous sodium hydroxide solution.

EXAMPLE 4

A component: a mixture consisting of 22.74 parts by weight of a block polyoxypropylene-polyoxyethylene polyol (I) having a hydroxyl number of 30, a content of terminal ethylene oxide units of 5.9% by weight, based on the weight of propylene oxide units, and containing about 70% of primary hydroxyl groups, obtained by alkoxylation of an initiator molecule mixture of glycerol and water in a weight ratio of 1:0.98, 45.10 parts by weight of a polyoxypropylene(86.5% by weight)-polyoxyethylene(13.5% by weight) polyol initiated using N,N-dimethyldipropylenetriamine and having a hydroxyl number of 35, 3.3 parts by weight of a graft polyether polyol having a hydroxyl number of 28, prepared by a free-radical in situ polymerization from a glycerol-initiated polyoxypropylene-polyoxyethylene polyol as graft base and a mixture of styrene and acrylonitrile in a weight ratio of 3:2 to form the material grafted on (Lupranol® 4100 from BASF AG), 4.0 parts by weight of a glycerol-initiated polyoxyethylene polyol having a hydroxyl number of 525 and a potassium ion content of 470 ppm, 1.6 parts by weight of ricinoleic acid, 0.4 parts by weight of a 40% strength by weight solution of potassium acetate in ethylene glycol, 2.86 parts by weight of the additive (f2) as described in Example 3 and 20.0 parts by weight of a 5% strength by weight solution of a sterically hindered amine (Naugard® 445) in the abovementioned block polyoxypropylene-polyoxyethylene polyol having a hydroxyl number of 30 (I).

B component: as described in Example 1

The production of a dashboard was carried out by a method similar to that described in Example 1, but the A and B components were mixed in a weight ratio of 100:45.

The dashboard removed from the mold after 2.5 minutes showed no sink marks or voids in the semirigid PU foam.

We claim:

1. A process for producing rigid or semirigid polyurethane foams comprising reacting:
   a) organic polyisocyanates with
   b) relatively high molecular weight polyhydroxyl compounds and, optionally,
   c) low molecular weight chain extenders and/or crosslinkers in the presence of
   d) a blowing agent,
   e) optionally, a catalyst,
   f) an additive and
   g) optionally, auxiliaries,
   wherein the blowing agent (d) comprises water and the additive (f) is selected from the group consisting of compounds of the formulae (f1) to (f4)

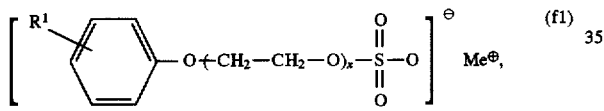

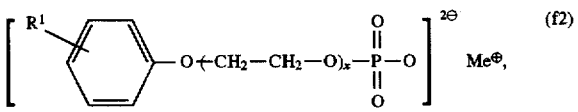

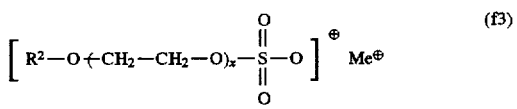

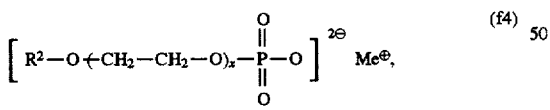

and mixtures thereof where $R^1$ and $R^2$ are linear or branched alkyl radicals having from 1 to 32 carbon atoms, X is an integer from 1 to 35 and Me is sodium, potassium, ammonium, calcium or magnesium, with the proviso that the number of cations and anions is equivalent.

2. A process as recited in claim 1, wherein the additive is used in an amount of from 0.01 to 2.5% by weight, based on the weight of the high molecular weight polyhydroxyl compounds (b).

3. A process as claimed in claim 1, wherein the relatively high molecular weight polyhydroxyl compounds (b) have a functionality of from 2 to 8, a hydroxyl number of from 14 to 500 and an alkali metal ion content of less than 10 ppm.

4. A process as claimed in claim 1, wherein the crosslinkers (c) are polyoxyalkylene polyols having a functionality of from 3 to 8, a hydroxyl number of from 210 to 1300 and an alkali metal ion content of from 150 to 1200 ppm.

5. A process as recited in claim 1, wherein the blowing agent comprises a mixture of water and a physically active blowing agent.

6. A process as claimed in claim 1, wherein the blowing agent (d) and the additives (f1), (f2), (f3) and/or (f4) are used in the form of an aqueous solution.

7. A composite element comprising
   A) at least one covering layer and
   B) at least one layer of a rigid or semirigid polyurethane foam produced by reacting
      a) at least one organic polyisocyanate with
      b) at least one relatively high molecular weight polyhydroxyl compound and, optionally,
      c) at least one low molecular weight chain extender and/or crosslinker in the presence of
      d) water as a blowing agent (d),
      e) optionally, catalysts,
      f) an additive (f) selected from the group consisting of compounds of the formulae (f1) to (f4)

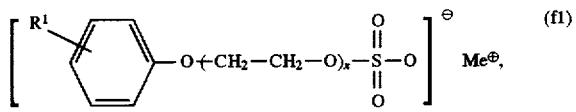

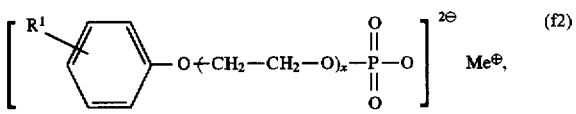

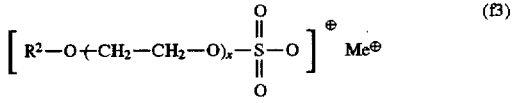

and

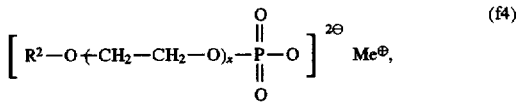

and mixtures thereof where $R^1$ and $R^2$ are linear or branched alkyl radicals having from 1 to 32 carbon atoms, X is an integer from 1 to 35 and Me is sodium, potassium, ammonium, calcium and magnesium, with the proviso that the number of cations and anions is equivalent, and also, optionally, additional other additives, and
      g) optionally, auxiliaries.

8. A composite element as claimed in claim 7, wherein the covering layer A comprises at least one material selected from the group consisting of polyvinyl chloride, polymer mixtures containing polyvinyl chloride, thermoplastic polyurethanes, polyacrylates and thermoplastic molding compositions of acrylate graft copolymers and homopolymers and/or copolymers of olefinically unsaturated monomers.

9. A composite element as claimed in claim 7, wherein the rigid or semirigid polyurethane foam is produced using at least one additive (f1), (f2), (f3) and/or (f4) in an amount of from 0.01 to 2.5% by weight, based on the weight of the relatively high molecular weight polyhydroxyl compounds (b).

10. A composite element as claimed in claim 7, wherein the rigid or semirigid polyurethane foam is produced using the blowing agent (d) and at least one additive (f1), (f2), (f3) and/or (f4) in the form of an aqueous solution.

11. A process for producing rigid or semirigid polyurethane foams comprising reacting (a) organic polyisocyanates with
(b) high molecular weight polyhydroxyl compounds and, optionally,
(c) low molecular weight chain extenders and/or crosslinkers in the presence of
(d) blowing agents, and, optionally,
(e) catalysts,
(f) additives, and
(g) auxiliaries, wherein the blowing agent (d) comprises water and the additive (f) comprises a component selected from the group consisting of a sulfonate salt of an acid group-containing alkylene oxide polymer and a phosphonate salt of an acid group-containing alkylene oxide polymer.

12. A process as recited in claim 11, wherein said additive (f) is selected from the group consisting of compounds of the formulae (f1) to (f4)

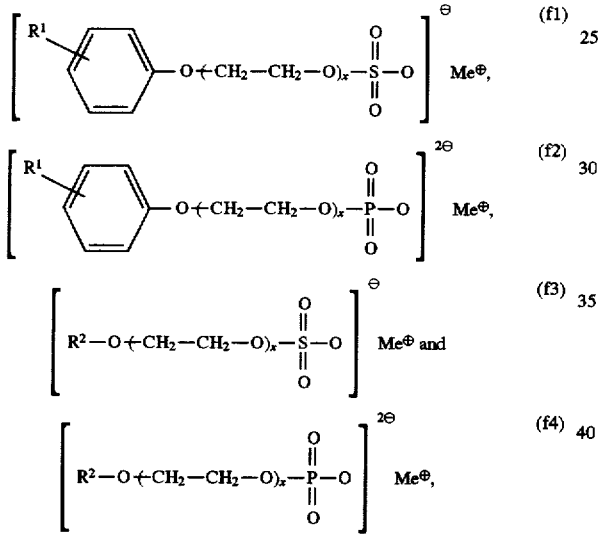

and mixtures thereof, where $R^1$ and $R^2$ are linear or branched alkyl radicals having from 1 to 32 carbon atoms;

X is an integer from 1 to 35; and

Me is sodium, potassium, ammonium, calcium, or magnesium, with the proviso that the number of cations and anions is equivalent.

13. A process as recited in claim 12, wherein the amount of additive (f) is from 0.01 to 2.5% by weight, based on the weight of the high molecular weight polyhydroxyl compounds (b).

14. A process as recited in claim 12, wherein the relatively high molecular weight polyhydroxyl compounds (b) have a functionality of from 2 to 8, a hydroxyl number of from 14 to 500 and an alkali metal ion content of less than 10 ppm.

15. A process as recited in claim 12, wherein the crosslinkers (c) are polyoxyalkylene polyols having a functionality of from 3 to 8, a hydroxyl number of from 210 to 1300 and an alkali metal ion content of from 150 to 1200 ppm.

16. A process as recited in claim 12, wherein the blowing agent (d) and the additives (f1), (f2), (f3), and/or (f4) are used in the form of an aqueous solution.

17. A composite element comprising (A) at least one covering layer; and
(B) at least one layer of a rigid or semirigid polyurethane foam produced by reacting
  (a) at least one organic polyisocyanate with
  (b) at least one relatively high molecular weight polyhydroxyl compound and, optionally,
  (c) at least one low molecular weight chain extender and/or crosslinker in the presence of
  (d) water as blowing agent (d),
  (e) optionally, catalysts, and
  (f) an additive (f) comprising a component selected from the group consisting of a sulfonate salt of an acid group-containing alkylene oxide polymer and a phosphonate salt of an acid group-containing alkylene oxide polymer.

18. A composite element as recited in claim 17, wherein said additive (f) is selected from the group consisting of at least one compound of the formulae (f1) to (f4)

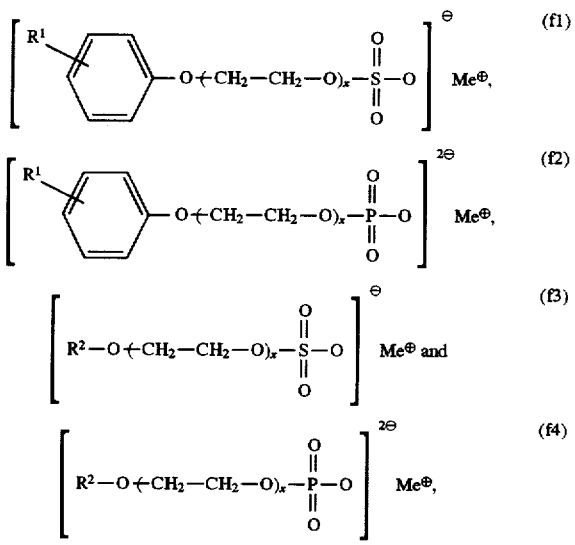

and mixtures thereof;

where $R^1$ and $R^2$ are linear or branched alkyl radicals having from 1 to 32 carbon atoms;

X is an integer from 1 to 35; and

Me is sodium, potassium, ammonium, calcium, and magnesium, with the proviso that the number of cations and anions is equivalent; and, optionally, additional additives and auxiliaries.

19. A composite element as recited in claim 18, wherein the covering layer A comprises it least one material selected from the group consisting of polyvinyl chloride, polymer mixtures containing polyvinyl chloride, thermoplastic polyurethanes, polyacrylates and thermoplastic molding compositions of acrylate graft copolymers and homopolymers and/or copolymers of olefinically unsaturated monomers.

20. A composite element as recited in claim 18, wherein the rigid or semirigid polyurethane foam is produced using at least one additive (f1), (f2), (f3), and/or (f4) in an amount of from 0.01 to 2.5% by weight based on the weight of the relatively high molecular weight polyhydroxyl compounds (b).

* * * * *